United States Patent [19]

Ueno et al.

[11] Patent Number: 5,895,498
[45] Date of Patent: Apr. 20, 1999

[54] ARITHMETIC PROCESSOR WHICH LATCHES DATA IN A TEMPORARY REGISTER BEFORE THE DATA IS LATCHED IN A GENERAL PURPOSE REGISTER

[75] Inventors: Maki Ueno; Nobuhiro Ide, both of Kanagawa-ken; Atsuhi Kunimatsu, Tokyo, all of Japan

[73] Assignee: Kabushiki Kaisha Toshiba, Kawasaki, Japan

[21] Appl. No.: 08/792,733

[22] Filed: Jan. 31, 1997

[30] Foreign Application Priority Data

Feb. 2, 1996 [JP] Japan .................. 8-017907

[51] Int. Cl.[6] .................................. G06F 13/372
[52] U.S. Cl. ......................... 711/169; 364/736.01
[58] Field of Search .................. 395/500; 364/716.05, 364/726.04, 736.01, 736.04, 736.05, 748.13, 748.14, 760.04; 711/168, 169

[56] References Cited

U.S. PATENT DOCUMENTS

4,124,890 11/1978 Vasenkov .................. 395/280
4,658,355 4/1987 Hatakeyama .................. 395/800.04
5,367,691 11/1994 Johnson .................. 364/736.05
5,561,810 10/1996 Ohtomo .................. 364/736.01
5,771,366 6/1998 Bjorksten .................. 395/393

*Primary Examiner*—Eric Coleman
*Attorney, Agent, or Firm*—Foley & Lardner

[57] ABSTRACT

A data processor has a general purpose register for storing arithmetic data and arithmetic results; an arithmetic device for MAC for performing a predetermined arithmetic operation by using the arithmetic data read from the general purpose register and outputting its arithmetic results to the general purpose register after a predetermined cycle; an arithmetic device for DIV for performing a predetermined arithmetic operation by using data read from the general purpose register and outputting its arithmetic results after a cycle longer than the predetermined cycle relative to the arithmetic device for MAC; and a temporary storing register for storing the arithmetic results outputted from the arithmetic device for DIV until the next arithmetic operation is terminated.

18 Claims, 7 Drawing Sheets

ARITHMETIC PROCESSOR WHICH LATCHES DATA IN A TEMPORARY REGISTER BEFORE THE DATA IS LATCHED IN A GENERAL PURPOSE REGISTER

BACKGROUND OF THE INVENTION

1. Technical Field to which the Invention belongs

The present invention relates to a data processing method and an apparatus thereof for performing an arithmetic operation by pipeline processing.

2. Prior Art

If one arithmetic device is arranged in an arithmetic unit capable of performing pipeline processing, no resource conflict is naturally caused when arithmetic results are written to a general purpose register for storing the arithmetic results. Further, when plural arithmetic devices are arranged in the arithmetic unit, such a resource conflict is not also caused when all arithmetic times (latency) of arithmetic instructions executed in the respective arithmetic devices are the same.

However, a latency such as division/extraction of the square root (SQRT), etc. is generally very large in comparison with latencies of other arithmetic operations. Accordingly, in the case of a construction in which a first instruction (hereafter, write this as MAC) and a second instruction (hereafter, write this as DIV) having many latencies in comparison with the first instruction are executed by separate arithmetic devices and these arithmetic results are written to one general purpose register, a writing conflict is caused since the arithmetic results are simultaneously written to this one general purpose register when two arithmetic operations are simultaneously terminated.

Methods of (1) the number of writing ports is set to be plural (in an arithmetic unit capable of simultaneously issuing plural instructions, etc.) (2) a subsequent instruction is stalled, are used to avoid the writing conflict.

In the following description, a conventional data processor will be explained by using a block diagram (FIG. 1) and a pipeline view (FIG. 2) showing an example in which a conflict is caused when two arithmetic results are written to a general purpose register. A method for avoiding this conflict will be also explained by using a pipeline view (FIG. 3) showing an example in which the conflict is avoided by using the above method of (2).

Figure 1:
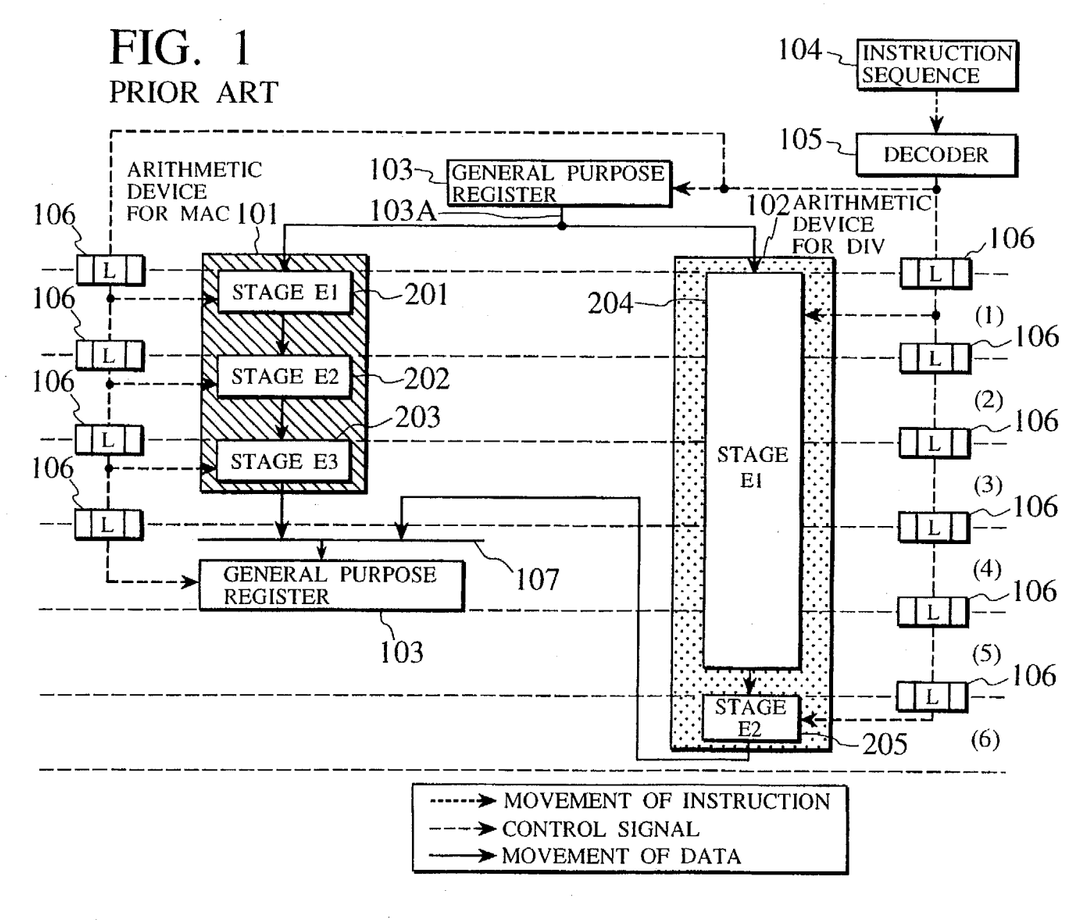
FIG. 1 is a block diagram showing the construction of a conventional data processor.

The conventional data processor shown in FIG. 1 has two kinds of arithmetic devices composed of an arithmetic device 101 for MAC and an arithmetic device 102 for DIV as an arithmetic unit for performing an arithmetic operation. This conventional data processor also has a general purpose register 103 of one kind for writing arithmetic results obtained by these arithmetic devices 101, 102. In this figure, a general purpose register 103 for writing and a general purpose register 103 for reading are separately written to easily see operations, but the actual general purpose register 103 is constructed by a general purpose register of one kind.

When an instruction is sent from an instruction sequence 104 (instruction contents will be described later) to a decoder 105, the decoder 105 designates an address for outputting arithmetic data to the arithmetic device 101 or 102 with respect to the general purpose register 103. Further, the decoder 105 judges which of the arithmetic device 101 for MAC and the arithmetic device 102 for DIV executes the arithmetic instruction. The decoder 105 then issues an arithmetic starting instruction to each of arithmetic executing stages (201, 202, 203 or 204, 205) of the arithmetic device executing the arithmetic operation through a latch circuit 106 every cycle.

When the arithmetic starting instruction is issued, arithmetic data are inputted from an output port 103A of the general purpose register 103 to the arithmetic device 101 or 102, and a predetermined arithmetic processing is performed every stage (201, 202, 203 or 204, 205). In the arithmetic device 101 for MAC, the arithmetic operation is terminated in a third cycle after the arithmetic data are inputted to this arithmetic device 101. Thereafter, arithmetic results are written to the general purpose register 103 in a fourth cycle via a selector 107 for writing the arithmetic results. In contrast to this, in the arithmetic device 102 for DIV, the arithmetic operation is terminated in a sixth cycle after the arithmetic data are inputted to this arithmetic device 102. In this arithmetic device 102, the arithmetic results are written to the general purpose register 103 in a seventh cycle via the selector 107 common to the arithmetic device 101 for MAC.

The instruction sequence is sequentially constructed by "MAC-a", "MAC-b", "DIV-a", "MAC-c", "MAC-d", "MAC-e", "MAC-f", "DIV-b", "MAC-g", "MAC-h", and "MAC-i". Here, "MAC-a", "MAC-b", - - - "MAC-i" show instructions of the same kind for executing the arithmetic operation in the arithmetic device 101 for MAC and writing the arithmetic results to the general purpose register 103. "DIV-a" and "DIV-b" show instructions of the same kind for executing the arithmetic operation in the arithmetic device 102 for DIV and writing the arithmetic results to the general purpose register 103.

Figure 2:
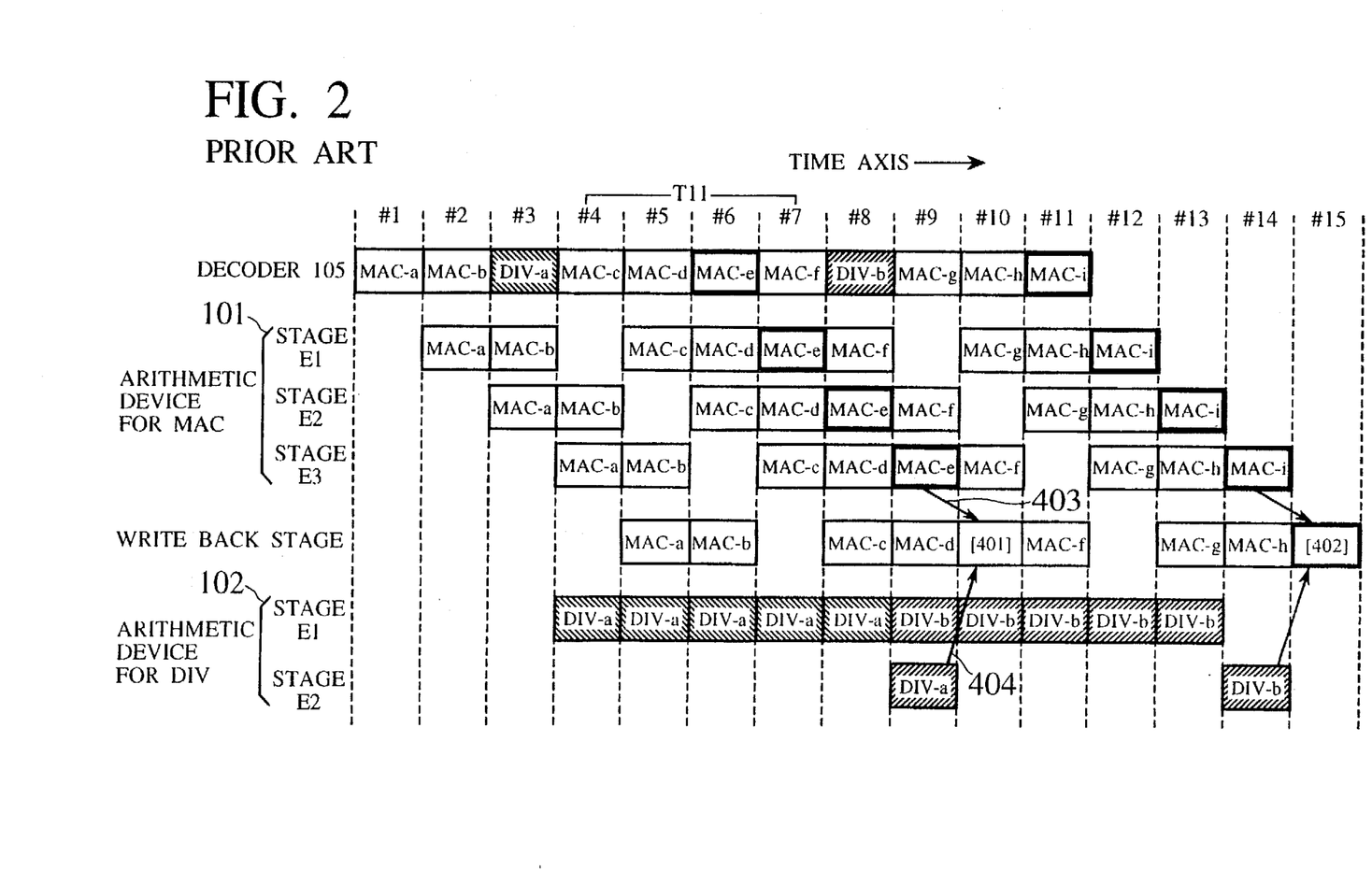
FIG. 2 is a pipeline view showing an example in which a conflict is caused in the data processor shown in FIG. 1.

A conflict at a writing time of the arithmetic results as a problem in the conventional data processor of FIG. 1 will be described by using the pipeline view of FIG. 2.

Respective executing stages of both the arithmetic devices 101 and 102 are mutually independent so that arithmetic instructions using pipeline processing can be basically executed continuously. Namely, the arithmetic device 101 has stage E1(201), stage E2(202) and stage E3(203) as executing stages, and the arithmetic device 102 has stage E1(204) and stage E2(205) as executing stages. However, as mentioned above, a time taken to perform the arithmetic operation in the arithmetic device 101 for MAC is three cycles and a time taken to perform the arithmetic operation in the arithmetic device 102 for DIV is six cycles. Accordingly, in FIG. 2, for example, MAC arithmetic instructions are sequentially issued and arithmetic processing is sequentially progressed in a period T11 from #4 to #7. However, the general purpose register 103 for writing the arithmetic results is common. Accordingly, as shown by [401] and [402] in FIG. 2, when arithmetic operations are simultaneously terminated in a cycle (#9 in the case of [401] previously located by one, arithmetic results begin to be simultaneously written (arrows 403, 404) in the next cycle (#10 in the case of [401] so that a conflict is caused.

Figure 3:
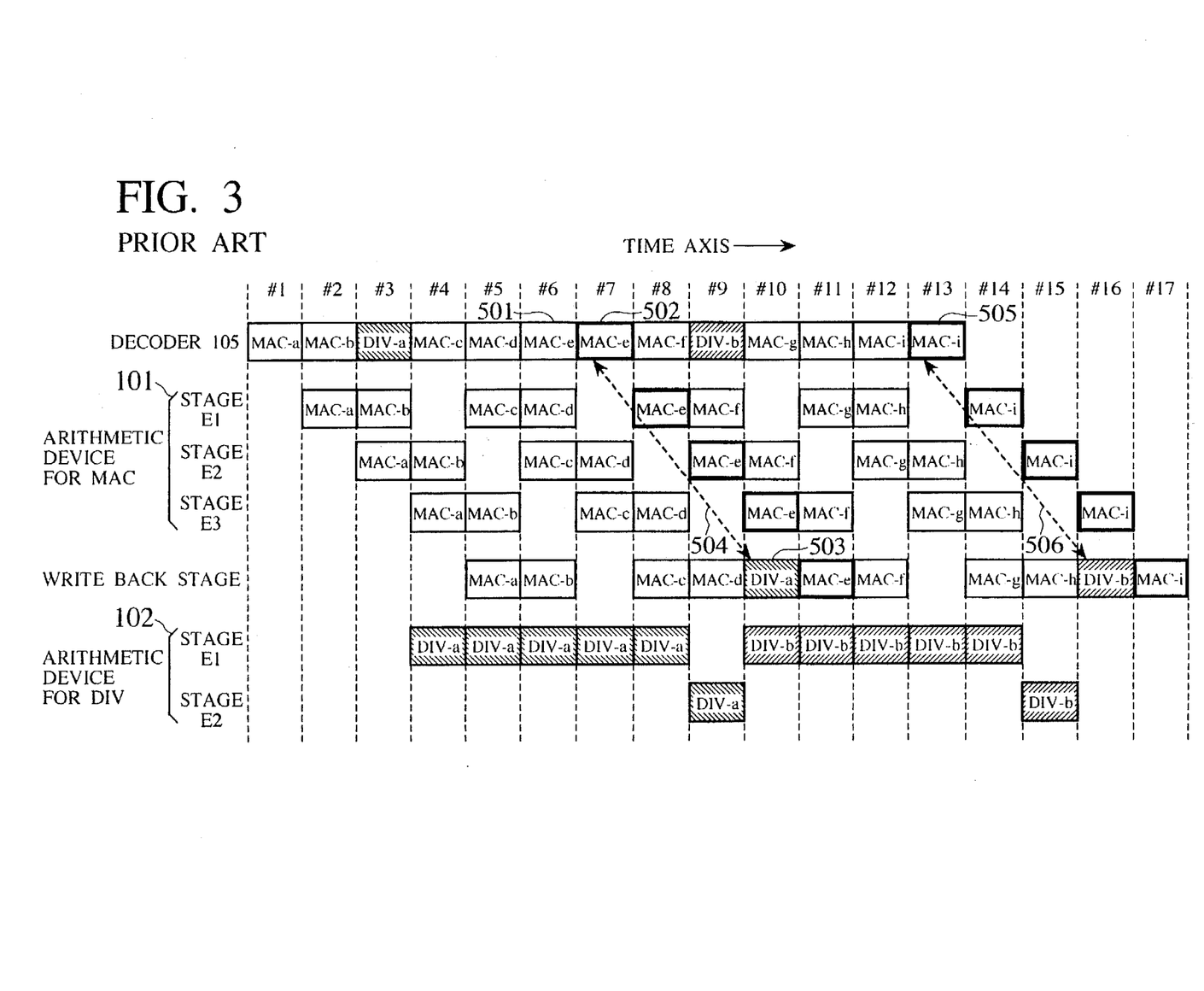
FIG. 3 is a pipeline view showing an example in which the conventional conflict is avoided.

Therefore, a conventional example using the above conflict avoiding method (2) not causing conflict as shown by [401] and [402] in FIG. 2 will next be explained by using FIG. 3.

Either one (here, instruction "MAC-e" (501) of the arithmetic device 101 for MAC) of timings of starting execution is shifted by one cycle (502 of #7 in FIG. 3) so as not to set the same timing at the writing stages of two arithmetic results. Thus, all the executing stages of the arithmetic device 101 for MAC become empty by one cycle (as shown by a dotted arrow 504) so that a blank of one cycle is formed at a write back stage (503) of #10.

Accordingly, the arithmetic results of "DIV-a" can be written back by using this blank write back stage (503) so that the conflict is avoided. The conflict of [402] of FIG. 2 can be avoided by similar countermeasures (505, 506 in FIG. 3).

However, there are the following problems in the conflict avoiding methods (1) and (2) of the above conventional data processor.

Namely, in the method (1) for setting the number of writing ports to be plural, the number of ports is simply increased and writing control, etc. become further complicated. In the method (2) for stalling a subsequent instruction, instructional execution is delayed by one cycle or more to write the arithmetic results so that an operating time of the arithmetic processing is late and performance of the entire data processor is deteriorated.

SUMMARY OF THE INVENTION

To solve the above-mentioned conventional problems, an object of the present invention is to provide a data processing method and an apparatus thereof capable of avoiding a writing conflict without making writing control complicated.

Another object of the present invention is to provide a data processing method and an apparatus thereof capable of avoiding a writing conflict without causing any stall, and rapidly performing arithmetic processing.

An even another object of the present invention is to provide a data processing method and an apparatus thereof capable of avoiding a writing conflict without making writing control complicated and without causing any stall, and rapidly performing arithmetic processing.

To achieve the above objects, there is provided a data processor comprising: a general purpose register for storing arithmetic data and arithmetic results; an arithmetic section for performing a predetermined arithmetic operation by using the arithmetic data read from said general purpose register and outputting arithmetic results; and a temporary storing register for storing the arithmetic results outputted from said arithmetic section until the next arithmetic operation is terminated; wherein said arithmetic section executes a new arithmetic operation; and the arithmetic results written to said temporary storing register are written to said general purpose register.

In accordance with this invention, the arithmetic section executes a new arithmetic operation and the arithmetic results written to the temporary storing register are written to the general purpose register.

To achieve the above objects, there is provided a data processor comprising: a general purpose register for storing arithmetic data and arithmetic results; a first arithmetic section for performing a predetermined arithmetic operation by using the arithmetic data read from said general purpose register and outputting its arithmetic results to said general purpose register after a predetermined cycle; a second arithmetic section for performing a predetermined arithmetic operation by using the arithmetic data read from said general purpose register and outputting its arithmetic results after a cycle longer than said predetermined cycle relative to said first arithmetic section; and a temporary storing register for storing the arithmetic results outputted from said second arithmetic section until the next arithmetic operation in said second arithmetic section is terminated.

In accordance with this invention, the first arithmetic section outputs its arithmetic results to the general purpose register after a predetermined cycle. The second arithmetic section outputs its arithmetic results to the temporary storing register after a cycle longer than the predetermined cycle relative to the first arithmetic section. The temporary storing register stores the arithmetic results outputted from the second arithmetic section until the next arithmetic operation is terminated.

In a preferred embodiment of the present invention, the number of cycles from the start of execution of the predetermined arithmetic operation in said second arithmetic section to writing of just prior arithmetic results written to said temporary storing register to said general purpose register is set to be equal to the number of cycles from the start of execution of the predetermined arithmetic operation in said first arithmetic section until the arithmetic results of the first arithmetic section are written to said general purpose register.

In accordance with this embodiment, when no arithmetic executions of the first and second arithmetic sections are simultaneously started, no conflict is caused when the arithmetic results are written from the first arithmetic section and the temporary storing register to the general purpose register.

In a preferred embodiment of the present invention, said temporary storing register stores the just prior arithmetic results in the predetermined arithmetic operation performed in said second arithmetic section; and said second arithmetic section executes a new arithmetic operation and writes the just prior arithmetic results stored to said temporary storing register to said general purpose register.

In accordance with this embodiment, the second arithmetic section executes a new arithmetic operation and writes the just prior arithmetic results of the second arithmetic section stored to the temporary storing register to the general purpose register.

In a preferred embodiment of the present invention, said second arithmetic section makes one or both of a divisional calculation and extraction of the square root.

In accordance with this embodiment, an arithmetic time of the second arithmetic section becomes very long.

To achieve the above objects, there is provided a data processor comprising: a general purpose register for storing arithmetic data and arithmetic results; a first arithmetic section for performing a predetermined arithmetic operation by using the arithmetic data read from said general purpose register and outputting its arithmetic results to said general purpose register after a first predetermined cycle; a second arithmetic section for performing a predetermined arithmetic operation by using the arithmetic data read from said general purpose register and outputting its arithmetic results after a second predetermined cycle; a third arithmetic section for performing a predetermined arithmetic operation by using the arithmetic data read from said general purpose register and outputting its arithmetic results after a third predetermined cycle; a first temporary storing register for storing the arithmetic results outputted from said second arithmetic section until the next arithmetic operation in said second arithmetic section is terminated; and a second temporary storing register for storing the arithmetic results outputted from said third arithmetic section until the next arithmetic operation in said third arithmetic section is terminated; wherein said second and third arithmetic sections respectively write the arithmetic results stored to said corresponding first and second temporary storing registers to said general purpose register; and one of said first, second and third arithmetic sections reads the arithmetic data from said general purpose register and executes the predetermined arithmetic operation.

In accordance with this invention, it is possible to precisely cope with a case in which there are three arithmetic sections or more.

To achieve the above objects, there is also provided a data processor comprising: a general purpose register for storing arithmetic data; a first arithmetic section for performing a predetermined arithmetic operation by using the arithmetic data read from said general purpose register and outputting its arithmetic results to said general purpose register as arithmetic data in a predetermined cycle; and a second arithmetic section for performing a predetermined arithmetic operation by using the arithmetic data read from said general purpose register and outputting its arithmetic results to said general purpose register as arithmetic data in a cycle longer than that of said first arithmetic section; arithmetic executing starting cycles of said first and second arithmetic sections being different from each other; wherein a temporary storing register for temporarily storing the arithmetic results of said second arithmetic section is provided; and the arithmetic results in said temporary storing register are written to said general purpose register at the same time interval as a writing time interval of said first arithmetic section to said general purpose register.

In accordance with this invention, writing timings of an instruction (a first instruction) for executing the arithmetic operation in the first arithmetic section and an instruction (a second instruction having an arithmetic time different from that of the first instruction) for executing the arithmetic operation in the second arithmetic section can be set to coincide with the same cycle. Accordingly, no writing conflict is caused in the first and second arithmetic sections and no additional stall as in the conventional case is required.

In a preferred embodiment of the present invention, the arithmetic results of said second arithmetic section written to said temporary storing register are data obtained by executing an arithmetic instruction provided to the second arithmetic section by one before, and data in said temporary storing register are written to said general purpose register in a blank cycle generated on the basis of issuing of an arithmetic instruction to said second arithmetic section, and the next arithmetic operation of said second arithmetic section is started.

In accordance with this embodiment, for example, one instruction performed from arithmetic execution to writing of data to the general purpose register is divided into an instruction for the arithmetic execution and an instruction for writing data to the general purpose register. Further, these two instructions are combined with each other and constitute one instruction. The existing arithmetic results of the second arithmetic section in the temporary storing register are written to the general purpose register in the blank cycle and the next arithmetic operation of the second arithmetic section is started by executing this instruction.

To achieve the above objects, there is provided a data processing method comprising the steps of: storing arithmetic data to a general purpose register; reading said arithmetic data stored to said general purpose register and performing a predetermined arithmetic operation by an arithmetic section to output arithmetic results; storing its arithmetic results to a temporary storing register until the next arithmetic operation is terminated; and executing a new arithmetic operation and writing said arithmetic results stored to said temporary storing register to said general purpose register by said arithmetic section.

To achieve the above objects, there is also provided a data processing method comprising the steps of: storing arithmetic data to a general purpose register; reading said arithmetic data stored to said general purpose register, performing a predetermined arithmetic operation by a first arithmetic section, and outputting its arithmetic results to said general purpose register after a predetermined cycle; reading said arithmetic data stored to said general purpose register, performing a predetermined arithmetic operation by a second arithmetic section, and outputting its arithmetic results after a cycle longer than said predetermined cycle relative to said first arithmetic section; and storing the arithmetic results outputted from said second arithmetic section by a temporary storing register until the next arithmetic operation in said second arithmetic section is terminated.

In a preferred embodiment of the present invention, the number of cycles from the start of execution of the predetermined arithmetic operation in said second arithmetic section to writing of just prior arithmetic results written to said temporary storing register to said general purpose register is set to be equal to the number of cycles from the start of execution of the predetermined arithmetic operation in said first arithmetic section until the arithmetic results of the first arithmetic section are written to said general purpose register.

In a preferred embodiment of the present invention, said temporary storing register stores the just prior arithmetic results in the arithmetic operation performed in said second arithmetic section; and said second arithmetic section executes a new arithmetic operation and writes the just prior arithmetic results stored to said temporary storing register to said general purpose register.

In a preferred embodiment of the present invention, said second arithmetic section makes one or both of a divisional calculation and extraction of the square root.

To achieve the above objects, there is also provided a data processing method comprising the steps of: storing arithmetic data to a general purpose register; reading said arithmetic data from said general purpose register, performing a predetermined arithmetic operation by a first arithmetic section, and outputting its arithmetic results to said general purpose register after a first predetermined cycle; reading said arithmetic data from said general purpose register, performing a predetermined arithmetic operation by a second arithmetic section, and outputting its arithmetic results after a second predetermined cycle; storing the arithmetic results outputted from said second arithmetic section by a first temporary storing register until the next arithmetic operation in said second arithmetic section is terminated; reading said arithmetic data from said general purpose register, performing a predetermined arithmetic operation by a third arithmetic section, and outputting its arithmetic results after a third predetermined cycle; storing the arithmetic results outputted from said third arithmetic section by a second temporary storing register until the next arithmetic operation in said third arithmetic section is terminated; writing the arithmetic results stored to said corresponding first and second temporary storing registers to said general purpose register by said second and third arithmetic sections, respectively, and reading the arithmetic data from said general purpose register and executing the predetermined arithmetic operation by one of said first, second and third arithmetic sections.

To achieve the above objects, there is also provided a data processing method comprising the steps of: storing arithmetic data to a general purpose register; performing a predetermined arithmetic operation by using the arithmetic data read from said general purpose register by a first arithmetic section, and outputting its arithmetic results to said general purpose register as arithmetic data in a predetermined cycle; performing a predetermined arithmetic operation in an executing starting cycle different from that of said first arithmetic section by using the arithmetic data read from said general purpose register by a second arithmetic section, and outputting its arithmetic results to the general purpose register as arithmetic data in a cycle longer than said predetermined cycle relative to said first arithmetic section; storing the arithmetic results of said second arithmetic section temporarily to a temporary storing register; and writing the arithmetic results in said temporary storing register to said general purpose register at the same time interval as a writing time interval of said first arithmetic section to said general purpose register.

In a preferred embodiment of the present invention, the arithmetic results of said second arithmetic section written to said temporary storing register are data obtained by executing an arithmetic instruction provided to the second arithmetic section by one before, and data in said temporary storing register are written to said general purpose register in a blank cycle generated on the basis of issuing of an arithmetic instruction to said second arithmetic section, and the next arithmetic operation of said second arithmetic section is started.

The nature, principle and utility of the invention will become more apparent from the following detailed description when read in conjunction with the accompanying drawings.

DESCRIPTION OF THE PREFERRED EMBODIMENTS

Figure 4:
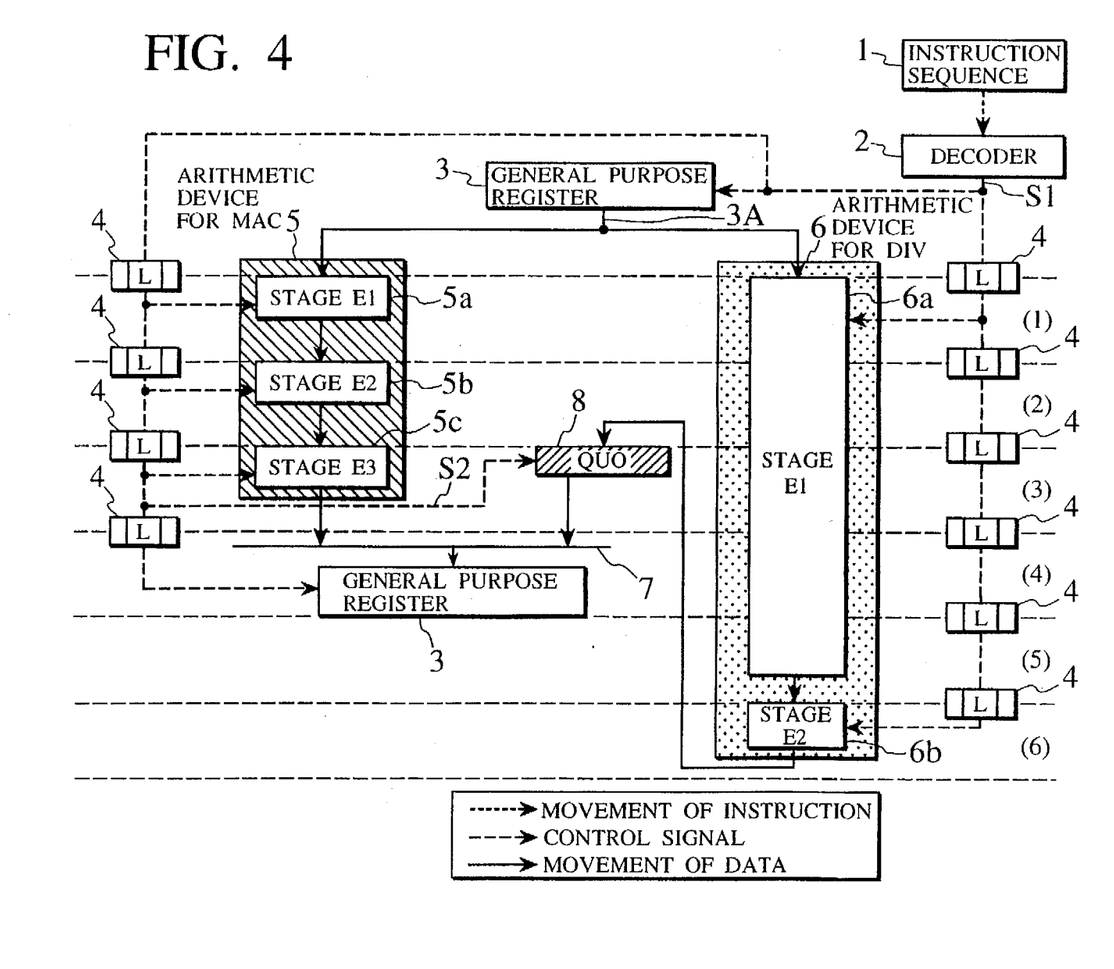
FIG. 4 is a block diagram showing the construction of a data processor in accordance with an embodiment of the present invention.

Embodiments of the present invention will next be explained on the basis of the drawings. FIG. 4 is a block diagram showing the construction of a data processor in accordance with a first embodiment of the present invention.

The data processor in this embodiment has an instruction sequence 1 for outputting an instruction (instruction contents will be described later). An output side of the instruction sequence 1 is connected to a decoder 2 for decoding the instruction from the instruction sequence 1 and outputting various kinds of control signals S1. An output side of the decoder 2 is connected to a general purpose register 3 of one kind for storing arithmetic data and is also connected to plural latch circuits (L) 4 arranged every cycle. In this figure, a general purpose register 3 for writing and a general purpose register 3 for reading are separately arranged to easily see operations thereof, but the actual general purpose register 3 is constructed by one kind of register.

An output port 3A of the general purpose register 3 is connected to two kinds of arithmetic devices composed of an arithmetic device 5 for MAC (a first arithmetic section) and an arithmetic device 6 for DIV (a second arithmetic section). The arithmetic device 5 for MAC performs a predetermined arithmetic operation in an order of stage E1(5a), stage E2(5b) and stage E3(5c) (in one cycle at each of these stages) by using data read from the general purpose register 3. This arithmetic device 5 outputs its arithmetic results to one of input terminals of a selector 7 in three cycles. In contrast to this, the arithmetic device 6 for DIV makes a divisional calculation, etc. in an order of stage E1(6a: five cycles) and stage E2(6b: one cycle) by using data read from the general purpose register 3. This arithmetic device 6 outputs its arithmetic results to a temporary storing register (QUO) 8 in six cycles. An output terminal of the temporary storing register 8 is connected to another terminal of the selector 7 and an output terminal of the selector 7 is connected to the general purpose register 3.

Here, the temporary storing register 8 constitutes one portion of features of the present invention and is a register for temporarily storing the arithmetic results of the arithmetic device 6 for DIV. An operation of the temporary storing register 8 is controlled by a control signal S2 from a latch circuit 4 so that the temporary storing register 8 can store the previous arithmetic results until the next DIV calculation is arithmetically executed and the arithmetic results is overwritten. As described later, data of the temporary storing register 8 are set to be written to the general purpose register 3 at the same time interval as a writing time interval of the arithmetic device 5 for MAC to the general purpose register 3.

Contents of the instruction sequence 1 are sequentially constructed by "MAC-a", "MAC-b", "DIV-a", "MAC-c", "MAC-d", "MAC-e", "MAC-f", "DIV-b", "MAC-g", "MAC-h", "MAC-i", and "DIV-c". Here, "MAC-a", "MAC-b", - - - "MAC-i" show instructions of the same kind for executing an arithmetic operation in the arithmetic device 5 for MAC and writing arithmetic results to the general purpose register 3. "DIV-a" shows an instruction for executing an arithmetic operation by using the arithmetic device 6 for DIV. "DIV-b" shows an instruction for writing the arithmetic results stored to the temporary storing register 8 to the general purpose register 3 and starting the next DIV calculation. Further, "DIV-c" shows an instruction for only writing the arithmetic results stored to the temporary storing register 8 to the general purpose register 3.

"DIV-b" in the above instruction sequence shows an arithmetic instruction constituting features of the present invention. When this instruction is executed, the temporary storing register 8 for temporarily storing the arithmetic results of the DIV arithmetic device 6 is required, and a control signal S2 for controlling an operation of this temporary storing register 8 is also required.

An operation of the data processor constructed above will next be explained.

When an instruction is sent from the instruction sequence 1 to the decoder 2, the decoder 2 designates an address for outputting arithmetic data to the arithmetic devices with respect to the general purpose register 3. Further, the decoder 2 judges which of the arithmetic device 5 for MAC and the arithmetic device 6 for DIV executes the arithmetic instruction. The decoder 2 then issues an arithmetic starting instruction to each of arithmetic executing stages (5a, 5b, 5c or 6a, 6b) of the arithmetic device executing the arithmetic operation through a latch circuit 4 every cycle.

When the arithmetic starting instruction is issued, arithmetic data are inputted from an output port 3A of the general purpose register 3 to the arithmetic device, and a predetermined arithmetic processing is performed every stage (5a, 5b, 5c or 6a, 6b). In the arithmetic device 5 for MAC, the arithmetic operation is terminated in a third cycle after the arithmetic data are inputted to this arithmetic device 5. Thereafter, the arithmetic device 5 for MAC writes the arithmetic results to the general purpose register 3 in a fourth cycle via the selector 7 for writing the arithmetic results.

In contrast to this, in the arithmetic device 6 for DIV, the arithmetic operation is terminated in a sixth cycle after the arithmetic data are inputted to this arithmetic device 6. The arithmetic results of the arithmetic device 6 for DIV are written to the temporary storing register 8 in a seventh cycle. The arithmetic results written to this temporary storing register 8 are written to the general purpose register 3 via the selector 7 at the same time interval as a time interval for writing the arithmetic results obtained in the arithmetic device 5 for MAC to the general purpose register 3 when the next DIV arithmetic instruction is issued. Two arithmetic instructions or more are not simultaneously issued to different arithmetic devices.

Figure 5:
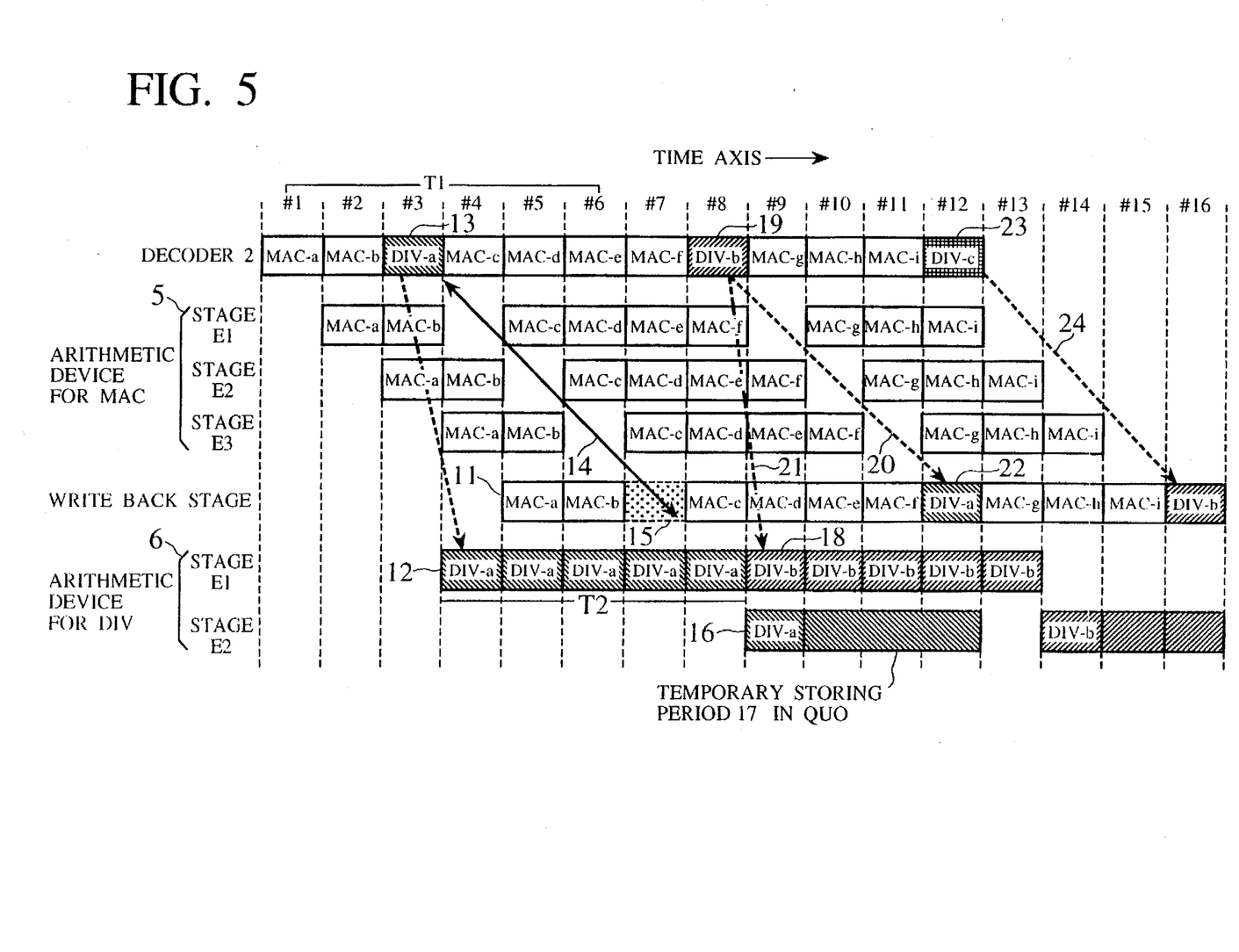
FIG. 5 is a view showing a pipeline chart in executing instructions in the data processor shown in FIG. 4.

FIG. 5 is a view showing a pipeline chart in executing instructions in the data processor shown in FIG. 4.

When "MAC-a" and "MAC-b" are sequentially issued in the decoder 2 (in cycles #1, #2), the arithmetic device 5 for MAC performs the arithmetic operation of three cycles in an order of stage E1(5a), stage E2(5b) and stage E2(5c). Arithmetic results of this arithmetic device 5 are written to the general purpose register 3 in a fourth cycle (#5) from the start of the arithmetic operation through the selector 7 (a write back stage 11). This arithmetic instruction is pipelined. When this arithmetic instruction is shown by a pipeline of FIG. 5, this arithmetic instruction is executed as shown in a cyclic period T1 from #1 to #6.

In contrast to this, when a "DIV-a" instruction (13) is inputted to the decoder 2, an arithmetic operation in this "DIV-a" instruction is executed (reference numeral 12) at a stage E1(6a) of the DIV arithmetic device 6. At this time, since no DIV arithmetic operation is performed before "DIV-a", no writing instruction of the arithmetic results from the temporary storing register 8 to the general purpose register 3 is required. When a DIV arithmetic instruction (13) is issued, a blank (14) for performing no arithmetic operation by one cycle is formed at each of the stages E1 to E3 in the arithmetic device 5 for MAC. As a result, a blank (15) of one cycle is also formed at the write back stage.

An arithmetic executing time T2 at the stage E1(6a) of the arithmetic device 6 for DIV is constructed by five cycles and an executing stage is subsequently moved to the stage E2(6b) as shown by reference numeral 16. Namely, when "DIV-b" is issued to the decoder 2 (#8), "DIV-a" is moved to the stage E2(6b) in the next cycle (#9). When the arithmetic operation is terminated, the arithmetic results are written to the temporary storing register 8 and are stored to this temporary storing register 8 as shown by reference numeral 17 until the next arithmetic results are written to this temporary storing register 8.

The next "DIV-b" can begin to be executed when the arithmetic stage of "DIV-a" is moved to the stage E2(6b). Accordingly, with respect to the execution of "DIV-b", the arithmetic operation can be started as shown by reference numeral 18 without any blank between "DIV-b" and "DIV-a". A "DIV-b" instruction (19) is an instruction capable of writing (as shown by reference numeral 20) the arithmetic results of "DIV-a" (13) to the general purpose register 3 from the temporary storing register 8 and starting the arithmetic operation of "DIV-b" (as shown by reference numeral 21). In this case, the arithmetic results of "DIV-a" (13) are really written to the general purpose register 3 in a fourth cycle (#12) after the start of execution of the instruction. The arithmetic results of "DIV-a" are temporarily stored to the temporary storing register 8 by executing this instruction. Thus, similar to the MAC arithmetic operation, these arithmetic results can be written to the general purpose register 3 during four cycles.

Finally, when all DIV arithmetic operations are terminated, the arithmetic results stored to the temporary storing register 8 are written to the general purpose register 3 in accordance with a "DIV-c" instruction (23) as shown by reference numeral 24 so that all the DIV arithmetic operations are terminated.

Thus, in this embodiment, the write back stage (22) conventionally left as a blank is utilized and the arithmetic results obtained by the "DIV-a" (13) and temporarily stored to the temporary storing register 8 are written to the general purpose register 3 as shown by reference numeral 22. Simultaneously, the next arithmetic operation can be started as shown by reference numeral 18. Therefore, no additional stall, etc. are required.

Figure 6:
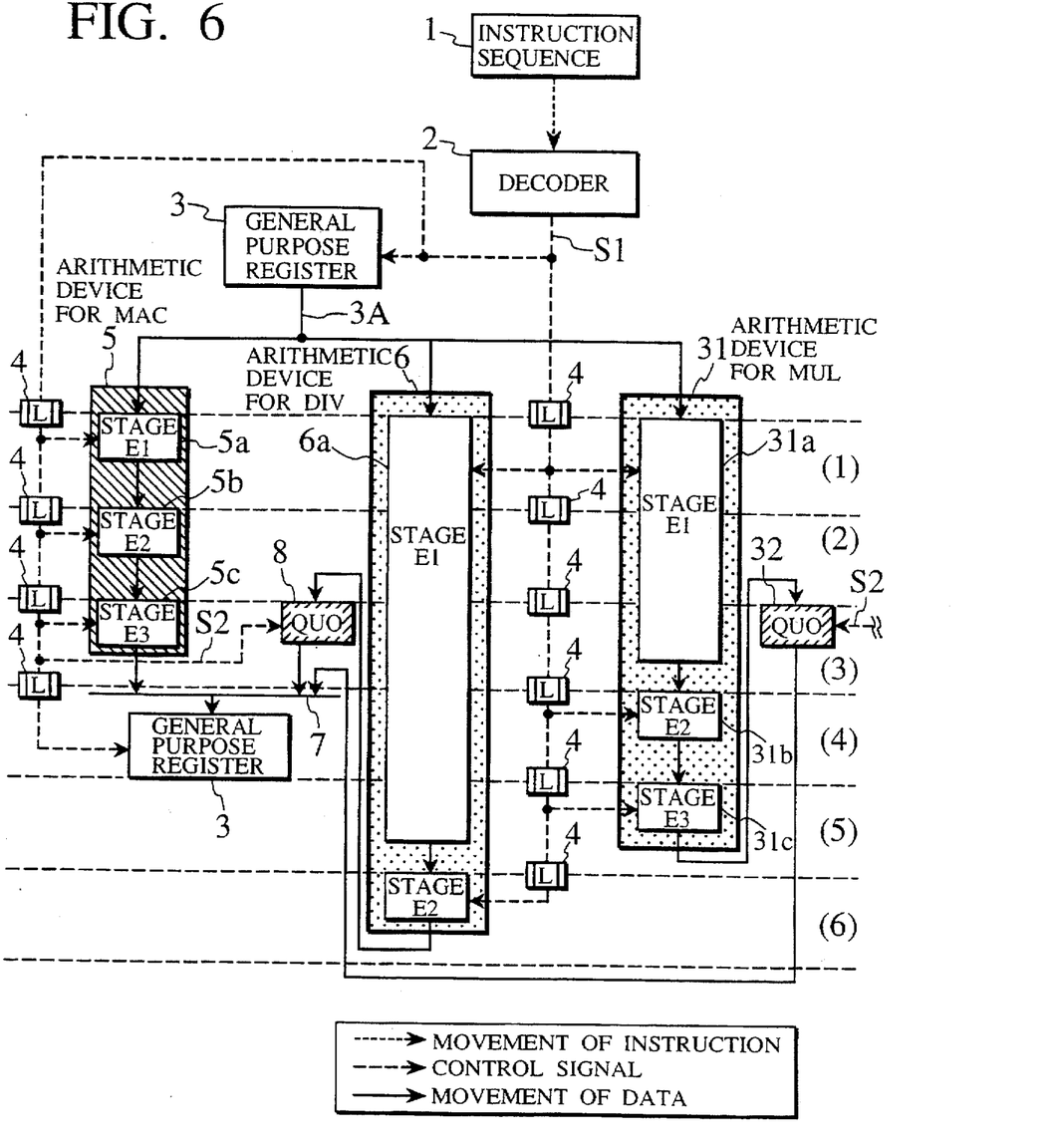
FIG. 6 is a block diagram showing the construction of a data processor in accordance with an embodiment of the present invention.

FIG. 6 is a block diagram showing the construction of a data processor in accordance with a second embodiment of the present invention. In this figure, elements common to those in FIG. 4 are designated by the same reference numerals.

In this embodiment, the data processor is constructed by three kinds of arithmetic devices having different arithmetic executing times. Namely, this data processor has an arithmetic device 31 for MUL in addition to the arithmetic device 5 for MAC and the arithmetic device 6 for DIV shown in FIG. 4. Similar to the above first embodiment, a general purpose register for writing arithmetic results obtained by these arithmetic devices 5, 6, and 31 is constructed by only a general purpose register 3 of one kind. Further, each of the DIV arithmetic device 6 and the arithmetic device 31 for MUL has an executing cycle number different from that of the arithmetic device 5 for MAC. Accordingly, similar to the above first embodiment, temporary storing registers 8 and 32 controlled by a control signal S2 are arranged with respect to the respective arithmetic devices 6 and 31.

An operation of the data processor in this embodiment will next be explained.

When an instruction is sent from an instruction sequence 1 to a decoder 2, the decoder 2 designates an address for outputting arithmetic data to the arithmetic devices with respect to the general purpose register 3. Further, the decoder 2 judges which of the arithmetic device 5 for MAC, the arithmetic device 6 for DIV and the arithmetic device 31 for MUL executes the arithmetic instruction. The decoder 2 then issues an arithmetic starting instruction to each of arithmetic executing stages (5a, 5b, 5c, 6a, 6b, or 31a, 31b, 31c) of the arithmetic device executing the arithmetic operation through a latch circuit 4 every cycle.

When the arithmetic starting instruction is issued, arithmetic data are inputted from an output port 3A of the general purpose register 3 to the arithmetic device and a predetermined arithmetic processing is performed every stage (5a, 5b, 5c, 6a, 6b, or 31a, 31b, 31c). In the arithmetic device 5 for MAC, the arithmetic operation is terminated in a third cycle after the arithmetic data are inputted to this arithmetic device 5. Thereafter, the arithmetic results are written to the general purpose register 3 in a fourth cycle via a selector 7 for writing the arithmetic results.

In contrast to this, in the arithmetic device 6 for DIV, the arithmetic operation is terminated in a sixth cycle after the arithmetic data are inputted to this arithmetic device 6. The arithmetic results of the DIV arithmetic device 6 are written to the temporary storing register 8 in a seventh cycle. In the arithmetic device 31 for MUL, the arithmetic operation is terminated in five cycles and its arithmetic results are written to the temporary storing register 32 in a sixth cycle.

The arithmetic results written to each of the temporary storing registers 8 and 32 are written to the general purpose register 3 at the same time interval as a time interval at which the arithmetic results obtained in the arithmetic device for MAC are written to the general purpose register 3. Two arithmetic instructions or more are not simultaneously issued to different arithmetic devices.

Contents of the instruction sequence 1 in this embodiment are sequentially constructed by "MAC-a", "MAC-b", "DIV-a", "MAC-c", "MAC-d", "MAC-e", "MAC-f", "M/D-a", "MAC-g", "MAC-h", "MAC-i", and "D/M-a". Here, "MAC-a", "MAC-b", - - - , "MAC-i" show instructions of the same kind for executing the arithmetic operation in the arithmetic device 5 for MAC and writing arithmetic results to the general purpose register 3. "DIV-a" shows an instruction for executing the arithmetic operation using the arithmetic device 6 for DIV. "M/D-a" shows an instruction for writing the arithmetic results of the arithmetic device 6 for DIV stored to the temporary storing register 8 to the general purpose register 3 and starting an arithmetic operation of the arithmetic device 31 for MUL. Further, "D/M-a" shows an instruction for writing the arithmetic results of the arithmetic device 31 for MUL stored to the temporary storing register 32 to the general purpose register 3 and starting the arithmetic operation of the arithmetic device 31 for MUL.

Figure 7:
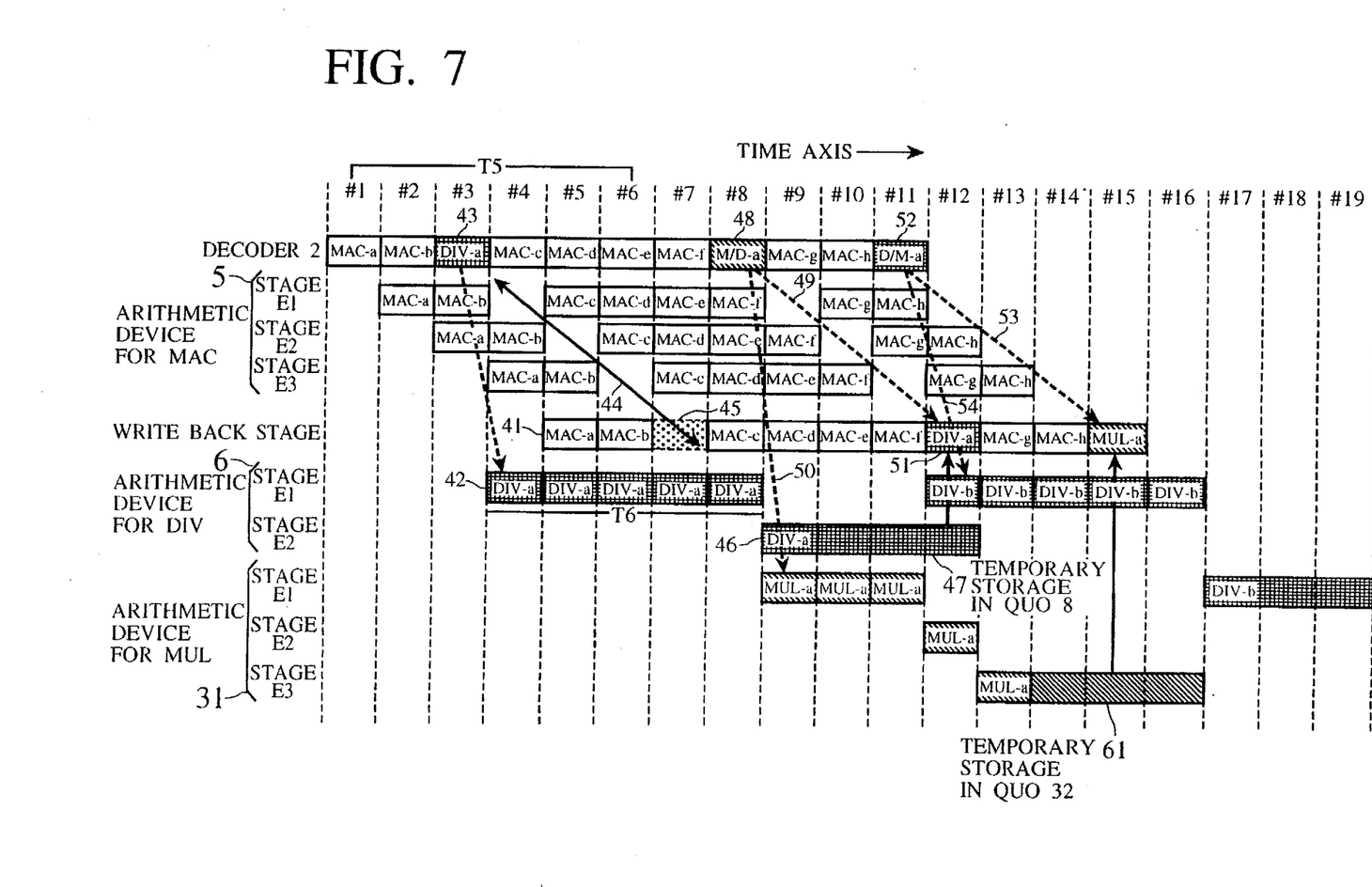
FIG. 7 is a view showing a pipeline chart in executing instructions in the data processor shown in FIG. 6.

FIG. 7 is a view showing a pipeline chart in executing instructions in the data processor shown in FIG. 6.

When "MAC-a" and "MAC-b" are sequentially issued in the decoder 2 (in cycles #1, #2), the arithmetic device 5 for MAC performs the arithmetic operation of three cycles in an order of stage E1(5a), stage E2(5b) and stage E2(5c). Arithmetic results of the arithmetic device 5 are written to the general purpose register 3 in a fourth cycle (#5) from the start of execution of an arithmetic operation through the selector 7 (a write back stage 41). This arithmetic instruction is pipelined. When this arithmetic instruction is shown by a pipeline chart of FIG. 4, this arithmetic instruction is executed as shown in a cyclic period T5 from #1 to #6.

In contrast to this, when a "DIV-a" instruction (43) is inputted to the decoder 2, an arithmetic operation in this "DIV-a" instruction is executed (reference numeral 42) at a stage E1(6a) of the DIV arithmetic device 6. At this time, since no DIV arithmetic operation is performed before "DIV-a", no writing instruction of the arithmetic results from the temporary storing register 8 to the general purpose register 3 is required. When a DIV arithmetic instruction (13) is issued, a blank (44) for performing no arithmetic operation by one cycle is formed at each of the stages E1 to E3 in the arithmetic device 5 for MAC. As a result, a blank (45) of one cycle is also formed at the write back stage.

An arithmetic executing time T6 at the stage E1(6a) of the arithmetic device 6 for DIV is constructed by five cycles and an executing stage is subsequently moved to the stage E2(6b) as shown by reference numeral 46. When its arithmetic operation is terminated, the arithmetic results are written to the temporary storing register 8 and are stored to the temporary storing register 8 as shown by reference numeral 47 until the next arithmetic results are written to the temporary storing register 8.

The next "M/D-a" instruction (48) is an instruction capable of writing the arithmetic results of the "DIV-a" instruction (43) from the temporary storing register 8 to the general purpose register 3 as shown by reference numerals 49, 51 and starting a MUL arithmetic operation in the arithmetic device 31 for MUL as shown by reference numeral 50. In this case, the arithmetic results of the "DIV-a" instruction (43) are really written to the general purpose register 3 in a fourth cycle (#12) after the "M/D-a" instruction is started.

A "D/M-a" instruction (52) issued in a cycle #11 is an instruction capable of writing the arithmetic results of "MUL-a" from the temporary storing register 32 to the general purpose register 3 as shown by reference numeral 53 and starting the next DIV-arithmetic operation (54).

Thus, advantages similar to the above first embodiment can be also obtained in this embodiment in which the data processor is constructed by three kinds of arithmetic devices having different arithmetic executing times. Further, data required as an operand in an arithmetic operation are easily exchanged.

As explained above in detail, in accordance with each of the embodiments of the present invention, writing timings of plural instructions having different arithmetic times can be set to coincide with the same cycle by using a new instructional system and storing arithmetic results to a temporary storing register. Accordingly, a writing conflict of the plural arithmetic devices can be avoided and the arithmetic operation can be executed without requiring any stall in the conventional case. Thus, the number of arithmetic executing cycles required to perform the arithmetic operation is reduced and an effect of improving performance of the data processor is obtained.

It is also possible to execute the operation of an arbitrary arithmetic device among several kinds of arithmetic devices and perform a writing operation from an arbitrary register among respective temporary storing registers to a general purpose register. Therefore, data required as an operand in the arithmetic operation can be easily exchanged.

It should be understood that many modifications and adaptations of the invention will become apparent to those skilled in the art and it is intended to encompass such obvious modifications and changes in the scope of the claims appended hereto.

What is claimed is:

1. A data processor comprising:

a general purpose register for storing arithmetic data and arithmetic results;

a first arithmetic section for performing a predetermined arithmetic operation by using the arithmetic data read from said general purpose register and outputting its arithmetic results to said general purpose register after a predetermined cycle;

a second arithmetic section for performing a predetermined arithmetic operation by using the arithmetic data read from said general purpose register and outputting its arithmetic results after a cycle longer than said predetermined cycle relative to said first arithmetic section; and a temporary storing register for storing the arithmetic results outputted from said second arithmetic section, said temporary storing register outputting during a blank cycle the arithmetic results to said general purpose register, at a cycle when said first arithmetic section is not outputting to the general purpose register.

2. The data processor as claimed in claim 1, wherein the number of cycles from the start of execution of the predetermined arithmetic operation in said second arithmetic section to writing of just prior arithmetic results written to said temporary storing register to said general purpose register is set to be equal to the number of cycles from the start of execution of the predetermined arithmetic operation in said first arithmetic section until the arithmetic results of the first arithmetic section are written to said general purpose register.

3. The data processor as claimed in claim 1, wherein said temporary storing register stores the just prior arithmetic results in the predetermined arithmetic operation performed in said second arithmetic section; and said second arithmetic section executes a new arithmetic operation and writes the just prior arithmetic results stored to said temporary storing register to said general purpose register.

4. The data processor as claimed in claim 1, wherein said second arithmetic section makes one or both of a divisional calculation and extraction of the square root.

5. The data processor as claimed in claim 2, wherein said second arithmetic section makes one or both of a divisional calculation and extraction of the square root.

6. The data processor as claimed in claim 3, wherein said second arithmetic section makes one or both of a divisional calculation and extraction of the square root.

7. A data processor comprising:

a general purpose register for storing arithmetic data and arithmetic results;

a first arithmetic section for performing a predetermined arithmetic operation by using the arithmetic data read from said general purpose register and outputting its arithmetic results to said general purpose register after a first predetermined cycle;

a second arithmetic section for performing a predetermined arithmetic operation by using the arithmetic data read from said general purpose register and outputting its arithmetic results after a second predetermined cycle;

a third arithmetic section for performing a predetermined arithmetic operation by using the arithmetic data read from said general purpose register and outputting its arithmetic results after a third predetermined cycle;

a first temporary storing register for storing the arithmetic results outputted from said second arithmetic section, said first temporary storing register outputting during a blank cycle the arithmetic results to said general purpose register, at a cycle when said first arithmetic section is not outputting to the general purpose register; and a second temporary storing register for storing the arithmetic results outputted from said third arithmetic section; wherein said second and third arithmetic sections respectively write the arithmetic results stored to said corresponding first and second temporary storing registers to said general purpose register; and one of said first, second and third arithmetic sections reads the arithmetic data from said general purpose register and executes the predetermined arithmetic operation, said second temporary storing register outputting during a blank cycle the arithmetic results to said general purpose register, at a cycle when said first arithmetic section and said second arithmetic section are not outputting to the general purpose register.

8. A data processor comprising:

a general purpose register for storing arithmetic data;

a first arithmetic section for performing a predetermined arithmetic operation by using the arithmetic data read from said general purpose register and outputting its arithmetic results to said general purpose register as arithmetic data in a predetermined cycle; and a second arithmetic section for performing a predetermined arithmetic operation by using the arithmetic data read from said general purpose register and outputting its arithmetic results to said general purpose register as arithmetic data in a cycle longer than that of said first arithmetic section; and arithmetic executing starting cycles of said first and second arithmetic sections being different from each other; wherein a temporary storing register for temporarily storing the arithmetic results of said second arithmetic section is provided; and the arithmetic results in said temporary storing register are written to said general purpose register at the same time interval as a writing time interval of said first arithmetic section to said general purpose register.

9. The data processor as claimed in claim 8, wherein the arithmetic results of said second arithmetic section written to said temporary storing register are data obtained by executing an arithmetic instruction provided to the second arithmetic section by one before, and data in said temporary storing register are written to said general purpose register in a blank cycle generated on the basis of issuing of an arithmetic instruction to said second arithmetic section, and the next arithmetic operation of said second arithmetic section is started.

10. A data processing method comprising the steps of:

storing arithmetic data to a general purpose register;

reading said arithmetic data stored to said general purpose register, performing a predetermined arithmetic operation by a first arithmetic section, and outputting its arithmetic results to said general purpose register after a predetermined cycle;

reading said arithmetic data stored to said general purpose register, performing a predetermined arithmetic operation by a second arithmetic section, and outputting its arithmetic results after a cycle longer than said predetermined cycle relative to said first arithmetic section; and storing the arithmetic results outputted from said second arithmetic section by a temporary storing register, and outputting during a blank cycle the arithmetic results to said general purpose register, at a cycle when said first arithmetic section and said second arithmetic section are not outputting to the general purpose register.

11. The data processing method as claimed in claim 10, wherein the number of cycles from the start of execution of the predetermined arithmetic operation in said second arithmetic section to writing of just prior arithmetic results written to said temporary storing register to said general purpose register is set to be equal to the number of cycles from the start of execution of the predetermined arithmetic operation in said first arithmetic section until the arithmetic results of the first arithmetic section are written to said general purpose register.

12. The data processing method as claimed in claim 10, wherein said temporary storing register stores the just prior arithmetic results in the arithmetic operation performed in said second arithmetic section; and said second arithmetic section executes a new arithmetic operation and writes the just prior arithmetic results stored to said temporary storing register to said general purpose register.

13. The data processing method as claimed in claim 10, wherein said second arithmetic section makes one or both of a divisional calculation and extraction of the square root.

14. The data processing method as claimed in claim 11, wherein said second arithmetic section makes one or both of a divisional calculation and extraction of the square root.

15. The data processing method as claimed in claim 12, wherein said second arithmetic section makes one or both of a divisional calculation and extraction of the square root.

16. A data processing method comprising the steps of:

storing arithmetic data to a general purpose register;

reading said arithmetic data from said general purpose register, performing a predetermined arithmetic operation by a first arithmetic section, and outputting its arithmetic results to said general purpose register after a first predetermined cycle;

reading said arithmetic data from said general purpose register, performing a predetermined arithmetic operation by a second arithmetic section, and outputting its arithmetic results after a second predetermined cycle;

storing the arithmetic results outputted from said second arithmetic section by a first temporary storing register, and outputting during a blank cycle the arithmetic results to said general purpose register, at a cycle when said first arithmetic section is not outputting to the general purpose register;

reading said arithmetic data from said general purpose register, performing a predetermined arithmetic operation by a third arithmetic section, and outputting its arithmetic results after a third predetermined cycle; and storing the arithmetic results outputted from said third arithmetic section by a second temporary storing register, and outputting during a blank cycle the arithmetic results to said general purpose register, at a cycle when said first arithmetic section and said second arithmetic section are not outputting to the general purpose register.

17. A data processing method comprising the steps of:

storing arithmetic data to a general purpose register;

performing a predetermined arithmetic operation by using the arithmetic data read from said general purpose register by a first arithmetic section, and outputting its arithmetic results to said general purpose register as arithmetic data in a predetermined cycle;

performing a predetermined arithmetic operation in an executing starting cycle different from that of said first arithmetic section by using the arithmetic data read from said general purpose register by a second arithmetic section, and outputting its arithmetic results to the general purpose register as arithmetic data in a cycle longer than said predetermined cycle relative to said first arithmetic section;

storing the arithmetic results of said second arithmetic section temporarily to a temporary storing register; and writing the arithmetic results in said temporary storing register to said general purpose register at the same time interval as a writing time interval of said first arithmetic section to said general purpose register.

18. The data processing method as claimed in claim 17, wherein the arithmetic results of said second arithmetic section written to said temporary storing register are data obtained by executing an arithmetic instruction provided to the second arithmetic section by one before, and data in said temporary storing register are written to said general purpose register in a blank cycle generated on the basis of issuing of an arithmetic instruction to said second arithmetic section, and the next arithmetic operation of said second arithmetic section is started.

* * * * *